United States Patent
Xu et al.

(10) Patent No.: US 9,534,652 B2
(45) Date of Patent: Jan. 3, 2017

(54) SHOCK ABSORBER

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Wei-Gui Xu, Jiashan (CN); Qi Xing, Jiashan (CN); Jun Li, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/693,305

(22) Filed: Apr. 22, 2015

(65) Prior Publication Data

US 2016/0116014 A1    Apr. 28, 2016

(30) Foreign Application Priority Data

Oct. 24, 2014    (CN) .......................... 2014 2 0619500

(51) Int. Cl.
   *F16F 9/06*    (2006.01)
   *F16F 9/348*    (2006.01)
   *F16F 9/22*    (2006.01)
   *B62K 25/08*    (2006.01)

(52) U.S. Cl.
   CPC ............... *F16F 9/067* (2013.01); *F16F 9/348* (2013.01); *B62K 25/08* (2013.01); *F16F 9/061* (2013.01); *F16F 9/062* (2013.01); *F16F 9/063* (2013.01); *F16F 9/22* (2013.01)

(58) Field of Classification Search
   CPC ............ F16F 9/061; F16F 9/062; F16F 9/063; F16F 9/22; B62K 25/08
   USPC .......... 188/282.5, 282.8, 269, 304, 312, 297
   See application file for complete search history.

(56) References Cited

U.S. PATENT DOCUMENTS

| | | | | |
|---|---|---|---|---|
| 6,120,049 A * | 9/2000 | Gonzalez | ............... | B62K 25/08 188/282.5 |
| 6,202,807 B1 * | 3/2001 | Levi | .................. | F16F 9/22 188/282.1 |
| 6,505,719 B2 * | 1/2003 | Gonzalez | ............... | B62K 25/08 188/319.2 |
| 7,722,069 B2 * | 5/2010 | Shirai | .................... | B62K 25/08 188/282.2 |
| 8,256,787 B2 * | 9/2012 | Inoue | .................... | B62K 25/08 280/275 |
| 8,317,171 B2 * | 11/2012 | Inoue | .................... | B62K 25/08 188/299.1 |

(Continued)

*Primary Examiner* — Thomas Irvin
(74) *Attorney, Agent, or Firm* — Zhigang Ma

(57) ABSTRACT

A shock absorber includes a push rod, a first piston, a cylinder, a piston rod, a second piston, and a third piston. The cylinder and the first piston cooperatively define a first oil cavity. The second piston, the first piston, and the cylinder cooperatively define a second oil cavity. The third piston and the cylinder cooperatively define a gas cavity. The first piston is configured to urge the hydraulic oil of the second oil cavity to flow into the first oil cavity and the third oil cavity in event the push rod is pushed. The third piston is configured to compress the gas in the gas cavity in event the third piston is urged toward the gas cavity, thereby creating a damping effect.

16 Claims, 5 Drawing Sheets

(56) References Cited

U.S. PATENT DOCUMENTS

| | | | |
|---|---|---|---|
| 8,356,829 B2 * | 1/2013 | Shirai | B62K 25/08 188/297 |
| 9,120,526 B2 * | 9/2015 | Ogura | B62K 25/08 |
| 2009/0001684 A1 * | 1/2009 | McAndrews | B62K 25/08 280/276 |
| 2011/0062679 A1 * | 3/2011 | Shirai | B62K 25/08 280/276 |
| 2014/0167380 A1 * | 6/2014 | Ogura | F16F 9/00 280/276 |

* cited by examiner

SHOCK ABSORBER

FIELD

The subject matter herein generally relates to energy absorbers.

BACKGROUND

Generally, a shock absorber is positioned between an axle and a vehicle body. The shock absorber includes a cylinder and a piston rod reciprocating within the cylinder. The cylinder is filled with an operating fluid, such as gas or oil, such that the operating fluid is moved by a piston valve secured to one end of the piston rod to absorb energy.

BRIEF DESCRIPTION OF THE DRAWINGS

Implementations of the present technology will now be described, by way of example only, with reference to the attached figures.

DETAILED DESCRIPTION

Figure 1:
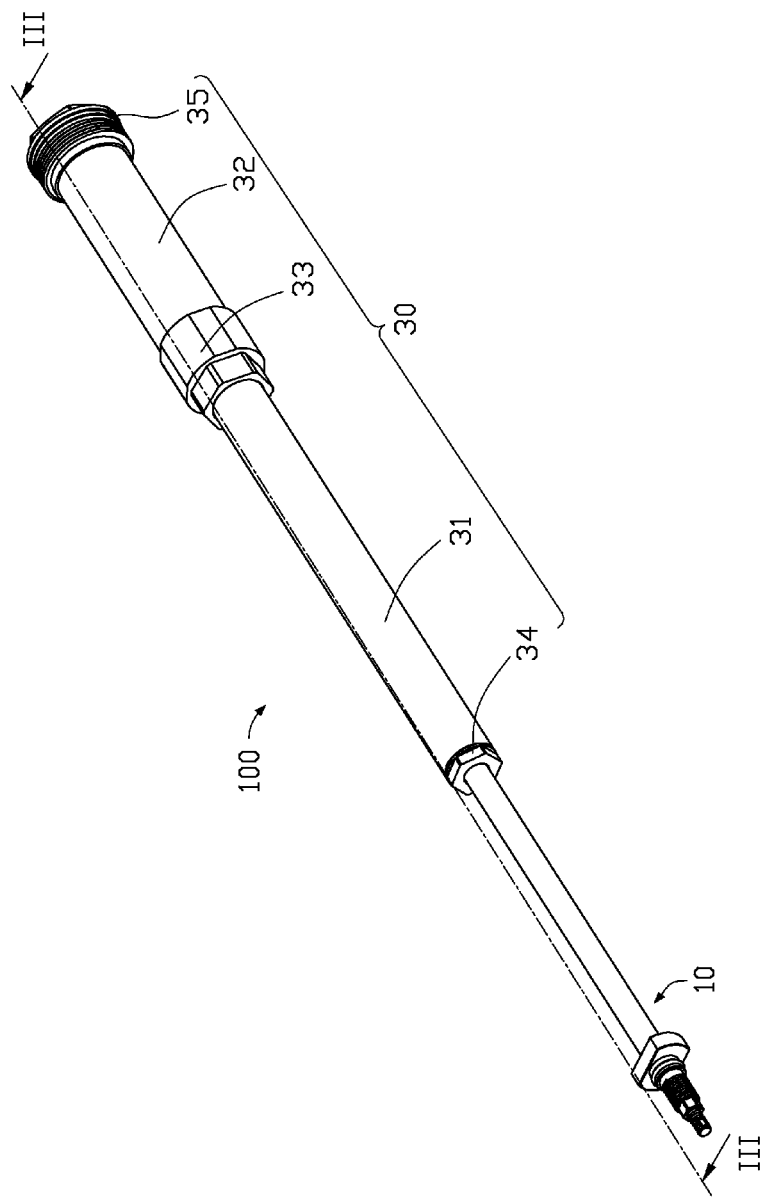
FIG. 1 is an isometric view of an embodiment of a shock absorber.
Figure 2:
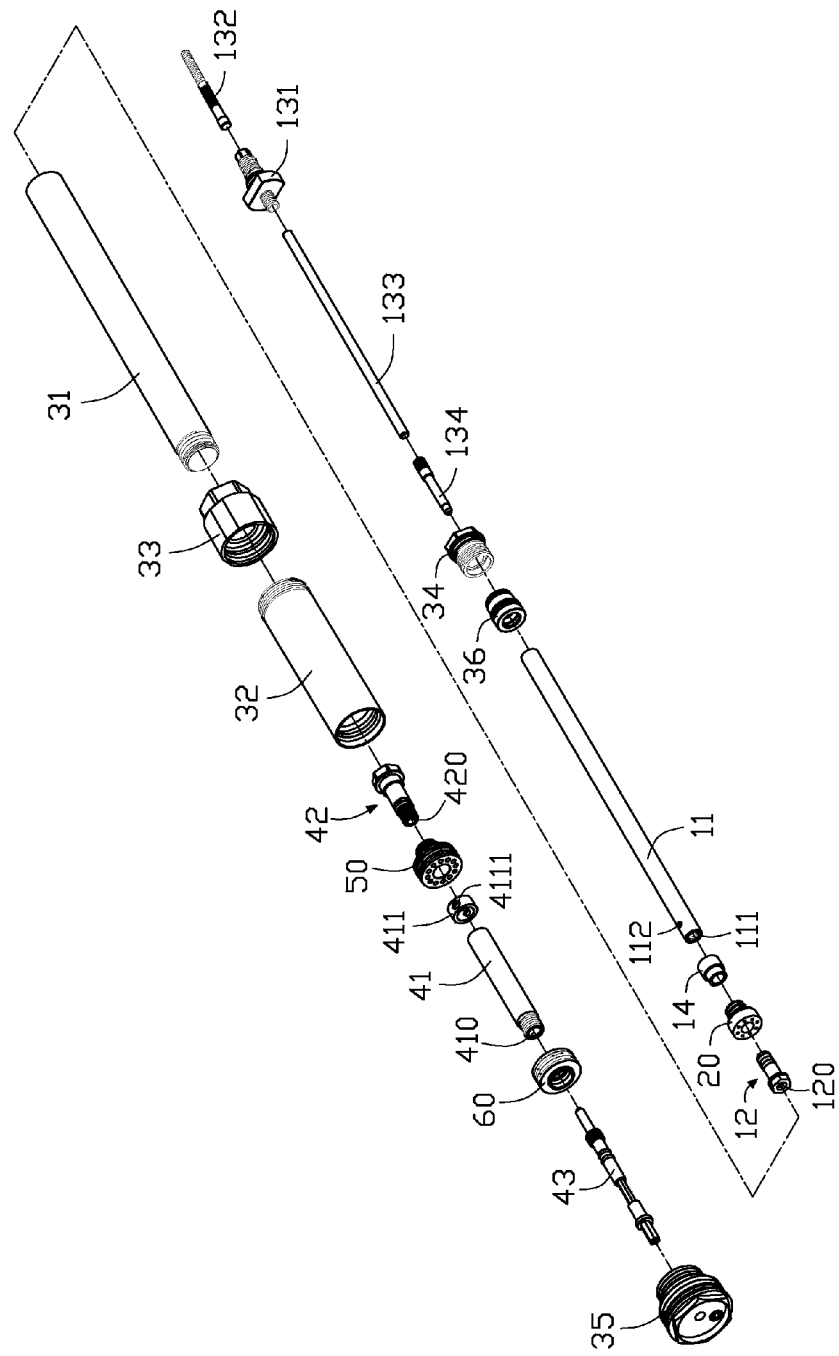
FIG. 2 is an exploded, isometric view of the shock absorber of FIG. 1.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape or other feature that the term modifies, such that the component need not be exact. For example, "substantially cylindrical" means that the object resembles a cylinder, but can have one or more deviations from a true cylinder. The term "comprising," when utilized, means "including, but not necessarily limited to", it specifically indicates open-ended inclusion or membership in the so-described combination, group, series and the like.

The present disclosure is described in relation to a shock absorber.

FIGS. 1 to 4 illustrate an embodiment of a shock absorber 100. The shock absorber 100 can include a push rod 10, a first piston 20 connected to the push rod 10, a cylinder 30 configured to received an end of the push rod 10, a piston rod 40 received in the cylinder 30, a second piston 50, and a third piston 60 received in the cylinder 30.

The push rod 10 can include a main body 11, a first fastening member 12 connected to an end of the main body 11, and a first end cover 13 configured to seal an opposite end of the main body 11. A first through hole 111 can be defined in the main body 11 along a center axis of the main body 11. A first oil hole 112 can be defined on opposite side walls (not labeled) of the main body 11 adjacent to the first fastening member 12. The first oil hole 112 can pass through the main body 11 and can be in communication with the first through hole 111. The first fastening member 12 can substantially be T-shaped. The first fastening member 12 can include a second through hole 120, a first connecting portion 121, and a first fastening head 122 positioned on an end of the first connecting portion 121. The second through hole 120 can pass through the first fastening member 12 along a center axis. The first through hole 111 and the first oil hole 112 can be in communication with the second through hole 120 by inserting the first connecting portion 121 into the first through hole 111 of the main body 11. The first fastening member 12 can have a threaded connection (not labeled) to the main body 11.

In the illustrated embodiment, the first end cover 13 can have a threaded connection (not labeled) to the main body 11. The first end cover 13 can include a main part 131 and a first sealing rod 132 passed through the main part 131. An end of the first sealing rod 132 can be inserted into the first through hole 111. The first sealing rod 132 can have a threaded connection (not labeled) to the main part 131.

In the illustrated embodiment, the main body 11 can further include a first auxiliary rod 133 and a first adjusting rod 134 received in the first through hole 111. An end of the first adjusting rod 134 can be adjacent to the second through hole 120. The first auxiliary rod 133 can be positioned between the first sealing rod 132 and the first adjusting rod 134. The position of the first adjusting rod 134 can be adjusted by what length of the first sealing rod 132 is inserted into the first through hole 111. Therefore, a flow of hydraulic oil through the first oil hole 112 and the second through hole 120 can be controlled by the first adjusting rod 134.

The first piston 20 can surround the first connecting portion 121. The piston 20 can be fastened between the main body 11 and the first fastening head 122 by inserting the first connecting portion 121 into the first through hole 111. The push rod 10 can further include a resisting sleeve 14. The resisting sleeve 14 can include a first sleeve 141 and a second sleeve 142 connected to the first sleeve 141. The first sleeve 141 can surround the main body 11. The second sleeve 142 can surround the first connecting portion 121. Therefore, the first piston 20 can be fastened between the second sleeve 142 and the first fastening head 122.

The first piston 20 can include a plurality of second oil holes 21, a first baffle 22 resisting against the second oil holes 21, and a first elastic member 23. The plurality of second oil holes 21 can pass through the first piston 20. A quantity of the second oil holes 21 can be an even number. The plurality of second oil holes 21 can be arranged in a circularity. The first elastic member 23 can be positioned between the first baffle 22 and the first sleeve 141. The first elastic member 23 can be a conical spring. The hydraulic oil can flow in only one direction along the second oil holes 21, from an end of the first piston 20 to an opposite end of the first piston 20, by the cooperation between the first baffle 22 and the first elastic member 23.

Figure 3:
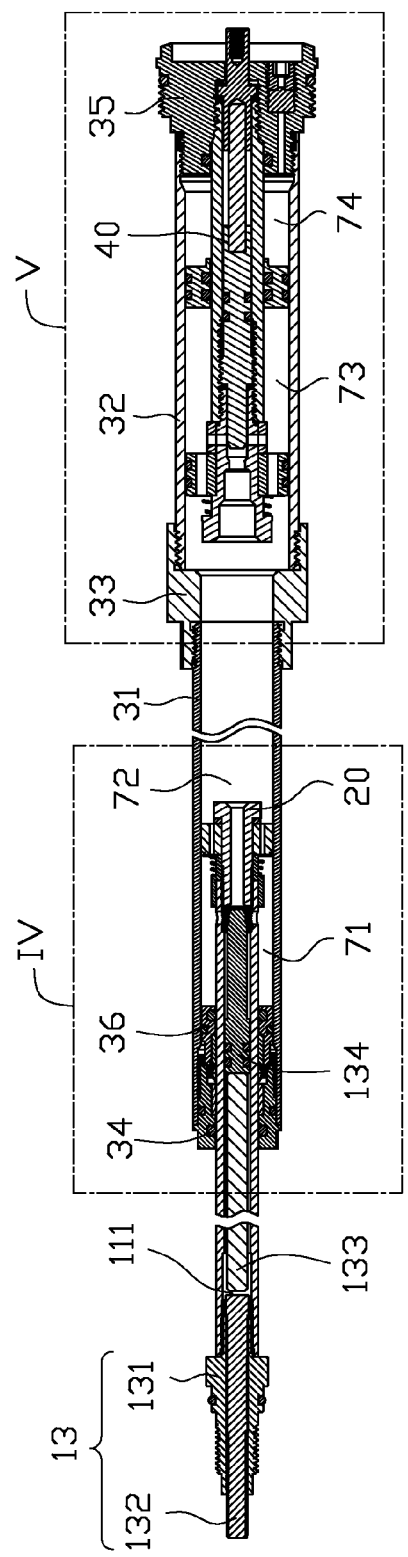
FIG. 3 is a partial cross-sectional view of the shock absorber of FIG. 1 along line III-III.
Figure 4:
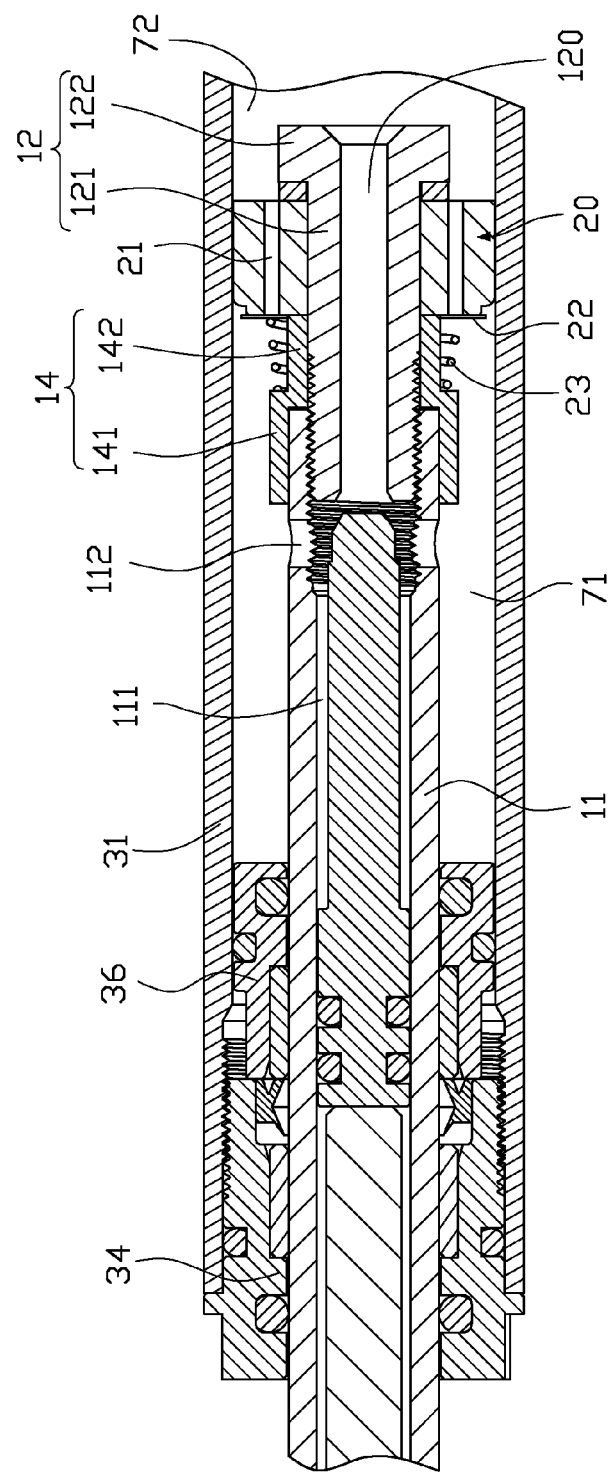
FIG. 4 is an enlarged view of portion IV of the shock absorber of FIG. 3.
Figure 5:
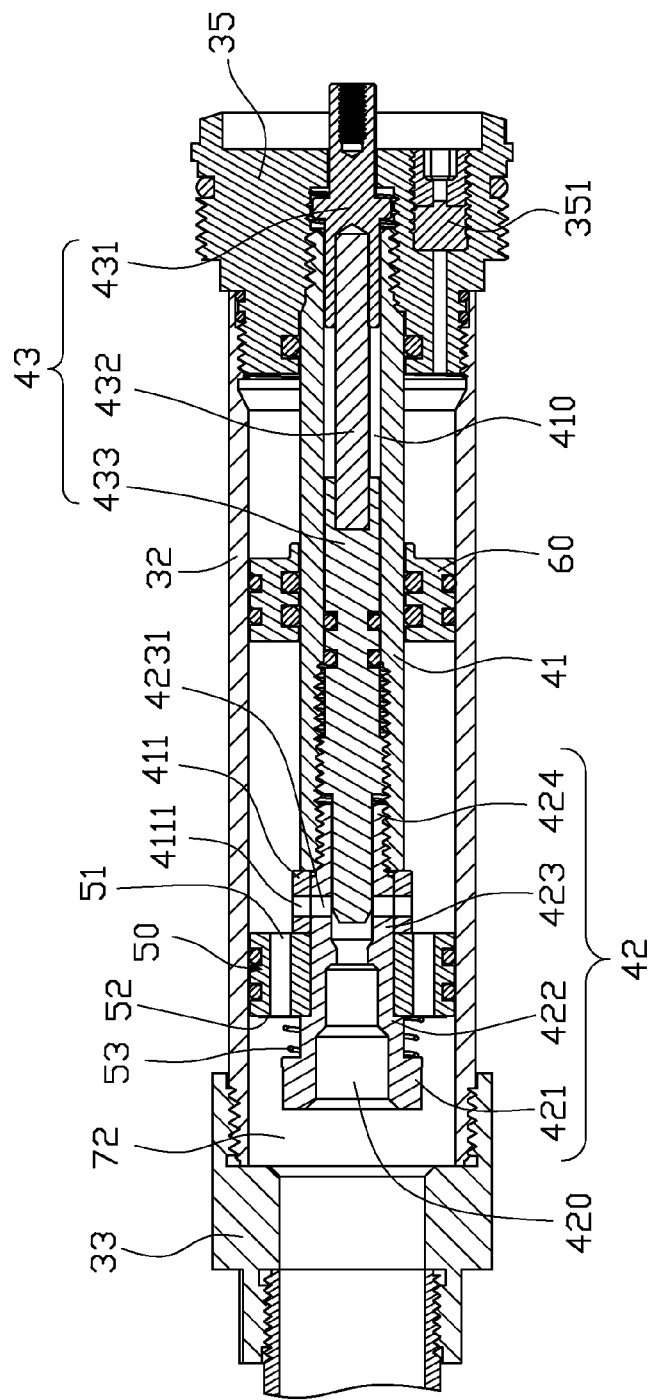
FIG. 5 is an enlarged view of portion V of the shock absorber of FIG. 3.

FIGS. 3 to 5 illustrate that the cylinder 30 can include a first cylinder 31, a second cylinder 32, a connecting member 33, a second end cover 34, and a third end cover 35. The first cylinder 31 can be in communication with the second cylinder 32 through the connecting member 33. The second end cover 34 can be positioned on an end of the first cylinder 31 away from the second cylinder 32. The main body 11 can slidably pass through the second end cover 34. The second end cover 34 can have a threaded connection (not labeled) to the first cylinder 31. The third end cover 35 can be positioned on an end of the second cylinder 32 away from the first cylinder 31. The third end cover 35 can have a threaded connection (not labeled) to the second cylinder 32. The first piston 20, the second end cover 34, and the first cylinder 31 can cooperatively define a first oil cavity 71. The first oil cavity 71 can be configured to be full with hydraulic oil when at rest. The first oil cavity 71 can include a restriction ring 36 configured to prevent the hydraulic oil of the first oil cavity 71 being forced out of the first cylinder 31.

The piston rod 40 can include a rod body 41, a second fastening member 42 connected to an end of the rod body 41, and sealing assembly 43 positioned on an opposite end of the rod body 41. A third through hole 410 can be defined on the rod body 41 along a center axis. An end of the rod body 41 with the sealing assembly 43 can be connected to the third end cover 35. The piston rod 40 can be threaded and secured in the second cylinder 32. The second fastening member 42 can include a fourth through hole 420, a second fastening head 421, a resisting portion 422 connected to the second fastening head 421, a coiling portion 423 connected to the resisting portion 422, and a second connecting portion 424 connected to the coiling portion 423. The fourth through hole 420 can be defined on the second fastening member 42 along a center axis. A free end of the second connecting portion 424 can be threaded and so inserted into the third through hole 410. The second fastening member 42 can be connected to the rod body 41 by the second connecting portion 424. A third oil hole 4231 can be defined on an end of the coiling portion 423 adjacent to the rod body 41. The third oil hole 4231 can pass through opposite side walls (not labeled) of the coiling portion 423. In the illustrated embodiment, the piston rod 40 can further include a ring 411 positioned on an end of the rod body 41. The ring 411 can surround the coiling portion 423. A fourth oil hole 4111 can be defined on the ring 411. The fourth oil hole 4111 can pass through opposite side walls (not labeled) of the ring 411. The fourth oil hole 4111 can thus be in communication with the third oil hole 4231. The third oil hole 4231 can be in communication with the fourth through hole 420.

The sealing assembly 43 can include a second sealing rod 431, a second auxiliary rod 432 connected to an end of the second sealing rod 431, and a second adjusting rod 433 connected to an end of the second auxiliary rod 432. An end of the second sealing rod 431 away from the second auxiliary rod 432 can pass through the third end cover 35. The second auxiliary rod 432 and the second adjusting rod 433 can be received in the third through hole 410. A free end of the second adjusting rod 433 can be adjacent to the third oil hole 4231. The position of the second adjusting rod 433 can be adjusted by what length of the second sealing rod 431 is inserted into the third through hole 410. A flow of hydraulic oil through the fourth through hole 420, the third oil hole 4231, and the fourth oil hole 4111 can be controlled by the second adjusting rod 433.

The second piston 50 can surround the coiling portion 423 of the second fastening member 42 and can resist against the resisting portion 422 and the ring 411. The third piston 60 can slidably surround the rod body 41. The second piston 50, the first piston 20, and the cylinder 30 can cooperatively define a second oil cavity 72. The third piston 60, the second piston 50, and the cylinder 30 can cooperatively define a third oil cavity 73. The third piston 60, the third end cover 35, and the cylinder 30 can cooperatively define a gas cavity 74 configure to house a gas. The second oil cavity 72 and the third oil cavity 73 can be configured to contain hydraulic oil and can be in fluidic communication with one another. A plurality of fifth oil holes 51 can be defined in the second piston 50. The plurality of fifth oil holes 51 can pass through opposite ends of the second piston 50. A quantity of the fifth oil holes 51 can be an even number. The plurality of fifth oil holes 51 can be arranged in a circularity.

In the illustrated embodiment, the second piston 50 can include a second baffle 52 adjacent to the second fastening head 421 and a second elastic member 53. The second elastic member 53 can resist against the second fastening head 421 and the second baffle 52. The second elastic member 53 can be a conical spring. The hydraulic oil can flow in only one direction through the fifth oil holes 51 by the cooperation between the second baffle 52 and the second elastic member 53. The third end cover 35 can further include a plug 351 configured to block the gas cavity 74. Therefore, the gas volume in the gas cavity 74 can be adjusted by the plug 351.

In assembly, the first piston 20 can surround the first connecting portion 121. The first baffle 22 and the first elastic member 23 can be installed around first connecting portion 121 to resist against an end of the second oil hole 21. The first sleeve 141 of the resisting sleeve 14 can surround an end of the main body 11 adjacent to the first oil hole 112. A free end of the first connecting portion 121 can be inserted into second sleeve 142 and can be extended into the first through hole 111 to connect the main body 11 to the first fastening member 121. A free end of the first fastening member 121 can be inserted into the first cylinder 31. The second end cover 34 and the restriction ring 36 can surround the rod body 41 and can be received in the first cylinder 31. Thereby, the second end cover 34 can be connected to the first cylinder 31. The first adjusting rod 134 and the first auxiliary rod 133 can be received in turn in the first through hole 111. The main part 131 can be connected to an end of the main body 11 away from the first cylinder 31. The first sealing rod 132 can be inserted into the main part 131 and can be extended into the first through hole 111. The second elastic member 53 and the second baffle 52 can be placed in turn around the resisting portion 422. The second piston 50 and the ring 411 can be placed around the coiling portion 423 to make the second baffle 52 resist against the fifth oil hole 51. The second connecting portion 424 can be inserted into the third through hole 410 to connect the rod body 41 to the second fastening member 42. The third piston 60 can surround the rod body 41. An end of the sealing assembly 43 with the second adjusting rod 433 can be inserted into the third through hole 410. An opposite end of the sealing assembly 43 with the second sealing rod 431 can pass through the third end cover 35. The second fastening head 421 can be inserted into the second cylinder 32 to allow the second piston 50 and the third piston 60 to be received in the second cylinder 32. The third end cover 35 can be connected to the second cylinder 32. The first cylinder 31 can be connected to the second cylinder 32 by the connecting member 33. The first oil cavity 71, the second oil cavity 72, and the third oil cavity 73 can be full of hydraulic oil via the second end cover 34. Finally, the gas cavity 74 can be full of a gas via the plug 351.

In use, the hydraulic oil of the second oil cavity 72 can be urged by the first piston 20 in event the push rod 10 is pushed into the cylinder 30. The hydraulic oil of the second oil cavity 72 can flow into the first oil cavity 71 via the second oil hole 21, the second through hole 120, the first through hole 111, and the first oil hole 112. The hydraulic oil of the second oil cavity 72 can also flow into the third oil cavity 73 via the fourth through hole 420, the third oil hole 4231, and the fourth oil hole 4111. The gas of the gas cavity 74 can be compressed in event the hydraulic oil of the third oil cavity 73 pushes against the third piston 60. In reverse, the gas of the gas cavity 74 can push the third piston 60 in event the push back against the push rod 10 is released. Thereby, the hydraulic oil of the third oil cavity 73 can flow into the second oil cavity 72 via the fifth oil hole 51, the fourth oil hole 4111, the third oil hole 4231, and the fourth through hole 420. The first piston 20 and the push rod 10 can be pushed by the hydraulic oil of the second oil cavity 72. Thereby, the hydraulic oil of the first oil cavity 71 can flow into the second oil cavity 72 via the second through hole 120, the first through hole 111, and the first oil hole 112.

In other embodiments, the first baffle 22, the second baffle 52, the first elastic member 23, and the second elastic member 53 can be replaced by a non-return valve, the flow of the second oil hole 21 and the fifth oil hole 51 being unidirectional.

In other embodiments, the ring 411 can be removed, the fourth oil hole 4111 can be in direct communication with the third oil hole 4231 and the fourth through hole 420. The main body 11, the first fastening member 12, and the first piston 20 can be integral. The rod body 41, the second fastening member 42, and the second piston 50 can also be integral.

As described above, the second oil cavity 72 can be in communication with the first oil cavity 71 and the third oil cavity 73. A speed of flow of the hydraulic oil from the first oil cavity 71 into the second oil cavity 72 can be slower than a speed of flow of the hydraulic oil from the second oil cavity 72 into the first oil cavity 71, via the first baffle 22 and the first elastic member 23. A speed of flow of the hydraulic oil from the second oil cavity 72 into the third oil cavity 73 can be slower than a speed of flow of the hydraulic oil from the third oil cavity 73 into the second oil cavity 72, via the second baffle 52 and the second elastic member 53. Therefore, a damping effect of the shock absorber 100 is improved because of the first oil cavity 71, second oil cavity 72, the third oil cavity 73, and the gas cavity 74.

The embodiments shown and described above are only examples. Many details are often found in the art such as the other features of a shock absorber. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A shock absorber comprising:
a push rod;
a first piston connected to an end of the push rod;
a cylinder configured to receive the push rod and the first piston;
a piston rod received within and fastened to the cylinder;
a second piston connected to an end of the piston rod, the end of the piston rod adjacent to the push rod; and
a third piston slidably positioned around the piston rod;
wherein the cylinder and the first piston cooperatively define a first oil cavity;
wherein the second piston, the first piston, and the cylinder cooperatively define a second oil cavity;
wherein the second piston, the third piston, and the cylinder cooperatively define a third oil cavity;
wherein the third piston and the cylinder cooperatively define a gas cavity configured to house a gas;
wherein the second oil cavity is communication with the first oil cavity and the third oil cavity;
wherein the first oil cavity, the second oil cavity, and the third oil cavity are configured to contain hydraulic oil and are in fluidic communication with one another;
wherein the first piston is configured to urge the hydraulic oil of the second oil cavity to flow into the first oil cavity and the third oil cavity in event the push rod is pushed;
wherein the third piston is configured to compress the gas in the gas cavity in event the third piston is urged toward the gas cavity, thereby creating a damping effect;
wherein the push rod comprises a main body defining a first through hole along a center axis, a first fastening member connected to the main body, and a first end cover configured for sealing the main body; the first piston is connected to the first fastening member, the first end cover comprises a main part and a first sealing rod passing through the main part, and an end of the first sealing rod is inserted into the first through hole;
wherein the main body of the push rod comprises a first oil hole, a first auxiliary rod and a first adjusting rod received in the first through hole, the first oil hole passes through opposite sidewalls of the main body, the first auxiliary rod is positioned between the first sealing rod and the first adjusting rod, and the position of the first adjusting rod is adjusted by what length of the first sealing rod is inserted into the first through hole;
wherein a second through hole is defined in the first fastening member and passes through the first fastening member along a center axis, and the second through hole is in communication with the first oil hole and the first through hole to make the first oil cavity communicate with the second oil cavity; and
wherein a flow of hydraulic oil through the first oil hole and the second through hole is controlled by the first adjusting rod.

2. The shock absorber as claimed in claim 1, wherein the first fastening member comprises a first connecting portion and a first fastening head positioned on an end of the first connecting portion, the first piston is placed around the first connecting portion, the first connecting portion is inserted into the first through hole, and the first piston is positioned between the main body and the fastening head.

3. The shock absorber as claimed in claim 2, wherein the push rod further comprises a resisting sleeve, the resisting sleeve comprises a first sleeve surround the main body and a second sleeve connected to the first sleeve, and the second sleeve surround the first connecting portion.

4. The shock absorber as claimed in claim 2, wherein the first piston comprises a plurality of second oil holes, a first baffle resist against the second oil hole, and a first elastic member, the second oil holes passes through the first piston, and the first elastic member resists against between the first baffle and the main body.

5. The shock absorber as claimed in claim 4, wherein the hydraulic oil only undirectionally flows from the second oil cavity to the first oil cavity by the cooperation between the first baffle and the first elastic member.

6. The shock absorber as claimed in claim 1, wherein the piston rod comprises a rod body and a second fastening member connected to an end of the rod body, the third piston is placed around the rod body, a third through hole is defined on the rod body along a center axis, and a third oil hole is defined on an end of the second fastening member adjacent to the rod body and passes through opposite side walls of the second fastening member.

7. The shock absorber as claimed in claim 6, wherein the piston rod further comprises a ring positioned on an end of the rod body, a fourth oil hole is defined on the ring and passes through opposite side walls of the ring, a fourth through hole is defined on the second fastening member along a center axis, the third oil hole is in communication with the fourth oil hole and the fourth through hole to make the third oil cavity communicate with the second oil cavity.

8. The shock absorber as claimed in claim 7, wherein the second fastening member comprises a second fastening head, a resisting portion connected to the second fastening head, a coiling portion connected to the resisting portion, and a second connecting portion connected to the coiling portion, the second piston is placed around the coiling portion, and an free end of the second connecting portion is inserted into the third through hole.

9. The shock absorber as claimed in claim 8, wherein the second piston resists against between the rod body and the resisting portion, the second piston comprises a plurality of fifth oil holes, a second baffle resist against the fifth oil holes, and a second elastic member, the fifth oil holes pass through opposite ends of the second piston, the second elastic member resists against between the second fastening head and the second baffle.

10. The shock absorber as claimed in claim 9, wherein the hydraulic oil flows in only one direction through the fifth oil holes, from the third oil cavity to the second oil cavity, by the cooperation between the second baffle and the second elastic member.

11. The shock absorber as claimed in claim 7, wherein the position of the second adjusting rod is adjusted by what length of the second sealing rod is inserted into the fourth through hole, and a flow of hydraulic oil through the fourth through hole, the third oil hole, and the fourth oil hole is controlled by the second adjusting rod.

12. The shock absorber as claimed in claim 6, wherein the piston rod further comprises a sealing assembly, the sealing assembly comprises a second sealing rod, a second auxiliary rod connected to an end of the second sealing rod, and a second adjusting rod connected to an end of the second auxiliary rod, the second auxiliary rod and the second adjusting rod are received in the third through hole, and a free end of the second adjusting rod is adjacent to the third oil hole.

13. The shock absorber as claimed in claim 1, wherein the cylinder comprises a first cylinder, a second cylinder, a connecting member, a second end cover, and a third end cover, the first cylinder is in communication with the second cylinder by the connecting member, the second end cover is positioned on an end of the first cylinder away from the second cylinder, the push rod slidably passes through the second end cover, the third end cover is positioned on an end of the second cylinder away from the first cylinder, and the piston rod, the second piston, and the third piston are received in the second cylinder.

14. The shock absorber as claimed in claim 13, wherein the third end cover comprises a plug configured to block the gas cavity.

15. The shock absorber as claimed in claim 1, wherein the first oil cavity comprises a restriction ring configured to prevent the hydraulic oil of the first oil cavity being extruded out of the cylinder.

16. A shock absorber comprising:
a push rod;
a first piston connected to an end of the push rod;
a cylinder configured to receive the push rod and the first piston;
a piston rod received within and fastened to the cylinder;
a second piston connected to an end of the piston rod, the end of the piston rod adjacent to the push rod; and
a third piston slidably positioned around the piston rod;
wherein the cylinder and the first piston cooperatively define a first oil cavity;
wherein the second piston, the first piston, and the cylinder cooperatively define a second oil cavity;
wherein the second piston, the third piston, and the cylinder cooperatively define a third oil cavity;
wherein the third piston and the cylinder cooperatively define a gas cavity configured to house a gas;
wherein the second oil cavity is communication with the first oil cavity and the third oil cavity;
wherein the first oil cavity, the second oil cavity, and the third oil cavity are configured to contain hydraulic oil and are in fluidic communication with one another;
wherein the first piston is configured to urge the hydraulic oil of the second oil cavity to flow into the first oil cavity and the third oil cavity in event the push rod is pushed;
wherein the third piston is configured to compress the gas in the gas cavity in event the third piston is urged toward the gas cavity, thereby creating a damping effect;
wherein the piston rod comprises a rod body and a second fastening member connected to an end of the rod body, the third piston is placed around the rod body, a third through hole is defined on the rod body along a center axis, and a third oil hole is defined on an end of the second fastening member adjacent to the rod body and passes through opposite side walls of the second fastening member; and
wherein the piston rod further comprises a ring positioned on an end of the rod body, a fourth oil hole is defined on the ring and passes through opposite side walls of the ring, a fourth through hole is defined on the second fastening member along a center axis, the third oil hole is in communication with the fourth oil hole and the fourth through hole to make the third oil cavity communicate with the second oil cavity.

* * * * *